US012739601B2

(12) United States Patent
Yu et al.

(10) Patent No.: US 12,739,601 B2
(45) Date of Patent: Sep. 15, 2026

(54) WIRELESS AUDIO BROADCAST DISCOVERY, SELECTION AND SUBSCRIPTION

(71) Applicant: Lenovo (Singapore) Pte. Ltd., Singapore (SG)

(72) Inventors: Jonathan Jen-Wei Yu, Raleigh, NC (US); Jacek Spiewla, South Lyon, MI (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 176 days.

(21) Appl. No.: 18/781,704

(22) Filed: Jul. 23, 2024

(65) Prior Publication Data

US 2026/0032408 A1 Jan. 29, 2026

(51) Int. Cl.
*H04W 4/06* (2009.01)
*H04R 3/00* (2006.01)

(52) U.S. Cl.
CPC ................ *H04W 4/06* (2013.01); *H04R 3/00* (2013.01); *H04R 2420/07* (2013.01)

(58) Field of Classification Search
CPC ........ H04W 4/06; H04R 3/00; H04R 2420/07
See application file for complete search history.

(56) References Cited

U.S. PATENT DOCUMENTS

2009/0061807 A1* 3/2009 Zigler ................ H04N 21/4383 455/303
2022/0086548 A1* 3/2022 Bloom ................... H04R 1/105
2023/0328495 A1* 10/2023 Alathur ................... H04W 4/80 455/41.2
2024/0147196 A1* 5/2024 Alpert ..................... H04W 4/06
2025/0300752 A1* 9/2025 Gn .......................... G06F 3/165

FOREIGN PATENT DOCUMENTS

WO WO-2009113040 A2 * 9/2009 ............ H04H 60/43

* cited by examiner

*Primary Examiner* — Mark Fischer
(74) *Attorney, Agent, or Firm* — Schwegman Lundberg & Woessner, P.A.

(57) ABSTRACT

A user device scans for wireless audio broadcasts. The wireless audio broadcasts originate in a vicinity of the user device. The user device receives a plurality of signals at the user device. The plurality of signals includes unstructured data, and the unstructured data include textual data and auditory data that relate to the wireless audio broadcasts. The user device analyzes the unstructured data, and it classifies the wireless audio broadcasts based on the unstructured data.

20 Claims, 8 Drawing Sheets

WIRELESS AUDIO BROADCAST DISCOVERY, SELECTION AND SUBSCRIPTION

TECHNICAL FIELD

Embodiments described herein relate to wireless audio broadcasts, and in an embodiment, but not by way of limitation, the discovery of, selection of, and subscription to, wireless audio broadcasts.

BACKGROUND

The adoption of novel wireless audio protocols and standards (e.g., Bluetooth Auracast) enables an unlimited number of in-range audio receivers to join a single transmitted wireless audio broadcast, similar to the manner in which many terrestrial radio listeners can tune in to a single radio broadcast. Users with supported personal audio devices can, through the use of an interface (e.g., smartphone, tablet or notebook computer), discover, select, join and subscribe to such wireless audio broadcasts. With potentially a great number of broadcasts available in the user's surrounding (e.g., an airport, a university campus, a stadium, and/or an office), users may find it challenging and time consuming to perform these common tuning tasks through the interface.

Specifically, the current way of discovering, selecting, joining and subscribing to such wireless audio broadcasts involves a user using a device, such as a smartphone, to facilitate a directed search for the broadcast. Using the device, the user must first scan for a list of available broadcasts in the user's immediate surroundings. This is typically a manual process in which the user first accesses the device settings and then initiates the scan. Subsequently, the device shows the available broadcasts in a listed fashion, typically ordered by strongest to weakest signal strength. The displayed broadcast names could be described by the transmitting device's model name (e.g., iPhone 13), a "friendly" name (e.g., "Mary's Phone"), or something else entirely. However, in many cases, broadcast names are not indicative of the program contents. The user therefore must determine which broadcast is relevant to them solely on the device name and relative position in the available broadcasts list. Current and proposed solutions for wireless audio broadcast tuning remain similar to previous interfaces, wherein the manual process of task completion can be time-consuming and frustrating for the user, particularly due to ambiguity in broadcast names and their position in the list. In summary, the existing solution for these tasks is a manual process that is time-consuming and can easily frustrate users due to broadcast name ambiguity.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

An embodiment relates to systems and methods that assist users in their task of discovering, selecting, joining and subscribing to one-to-many wireless audio broadcasts. More specifically, an embodiment is a tuning interface to assist these users. The service can be a background service that aggregates, classifies and sorts available broadcasts. The service can continually scan for wireless audio broadcasts in a vicinity, and upon discovering and receiving the broadcasts, the broadcasts can be classified and/or labeled using textual metadata and audio feature analysis. The broadcasts can then be ranked according to numerous criteria via a recommender system. The sorted broadcasts are presented to the user through a visual (e.g., a phone screen) or non-visual (e.g., speech in an ear bud) user interface. In an embodiment, users may also subscribe to broadcasts based on contextual triggers (e.g., a time, a place, a relationship and/or a distance (from a transmitting device)).

In another embodiment, a user can pre-join a broadcast ahead of the time of the broadcast. The device can also automatically bring the tuning interface to the foreground of a visual or non-visual interface when broadcasts are detected. The device can also automatically tune in to the most relevant broadcast when putting on a listening device such as a headset.

Figure 1:
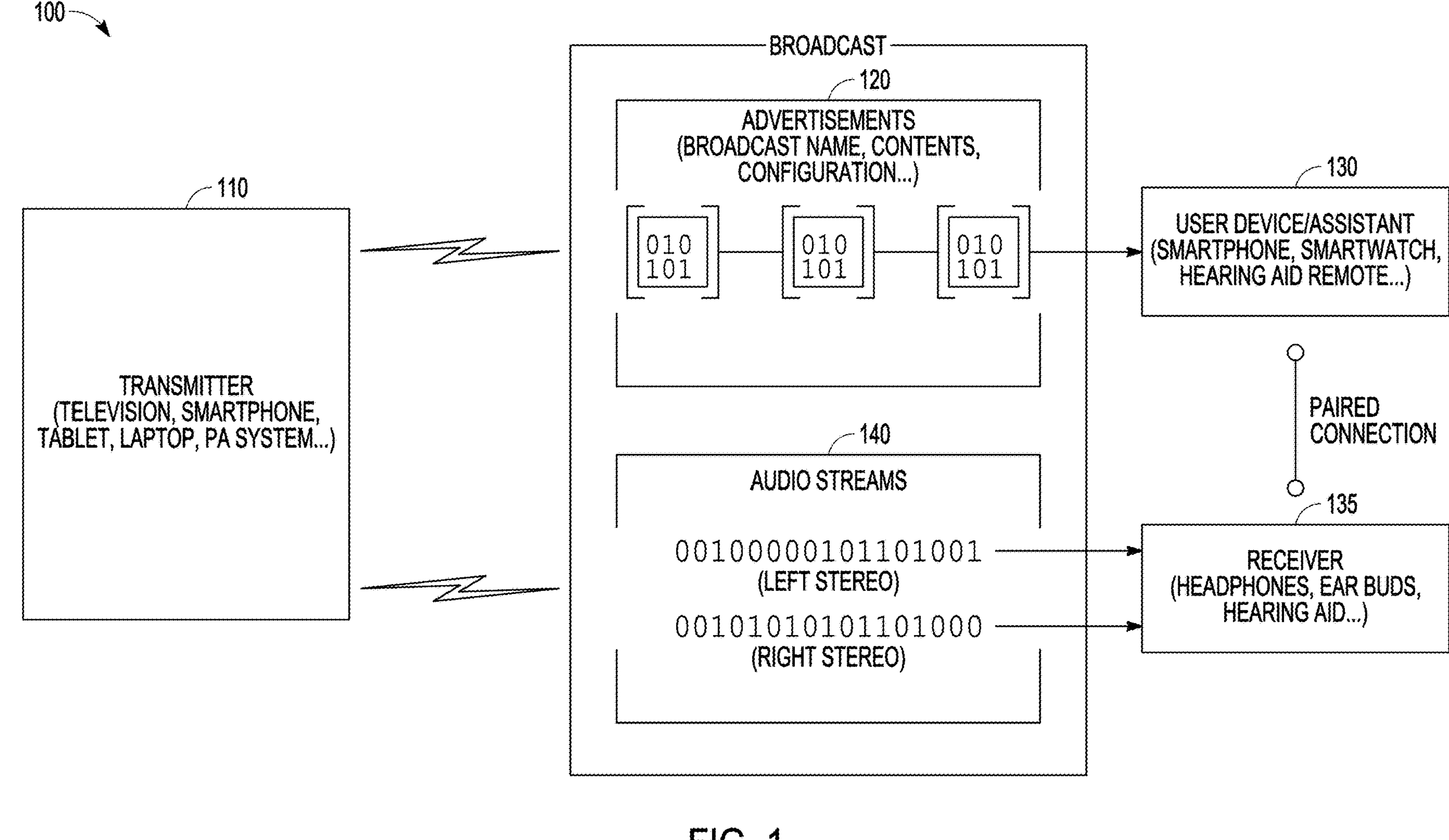
FIG. 1 is a block diagram of a wireless broadcast system.

FIG. 1 is a block diagram of a wireless broadcast system 100. The system 100 includes a transmitter 110. As indicated in FIG. 1, the transmitter 110 can be a television, smartphone, tablet, laptop, public address system or other transmitting device. The transmitter 110 broadcasts advertisements 120, which can include broadcast names, contents, configurations and other information. The advertisements 120 are received by a user device 130, and they are displayed on a screen of the user device 130 or transmitted to a non-visual unit 135 such as ear buds via a Bluetooth connection. A user can select a broadcast, and then the transmitter 110 transmits the selected broadcast via an audio stream 140 to the user device 130 or user/receiver device 135.

Figure 2A:
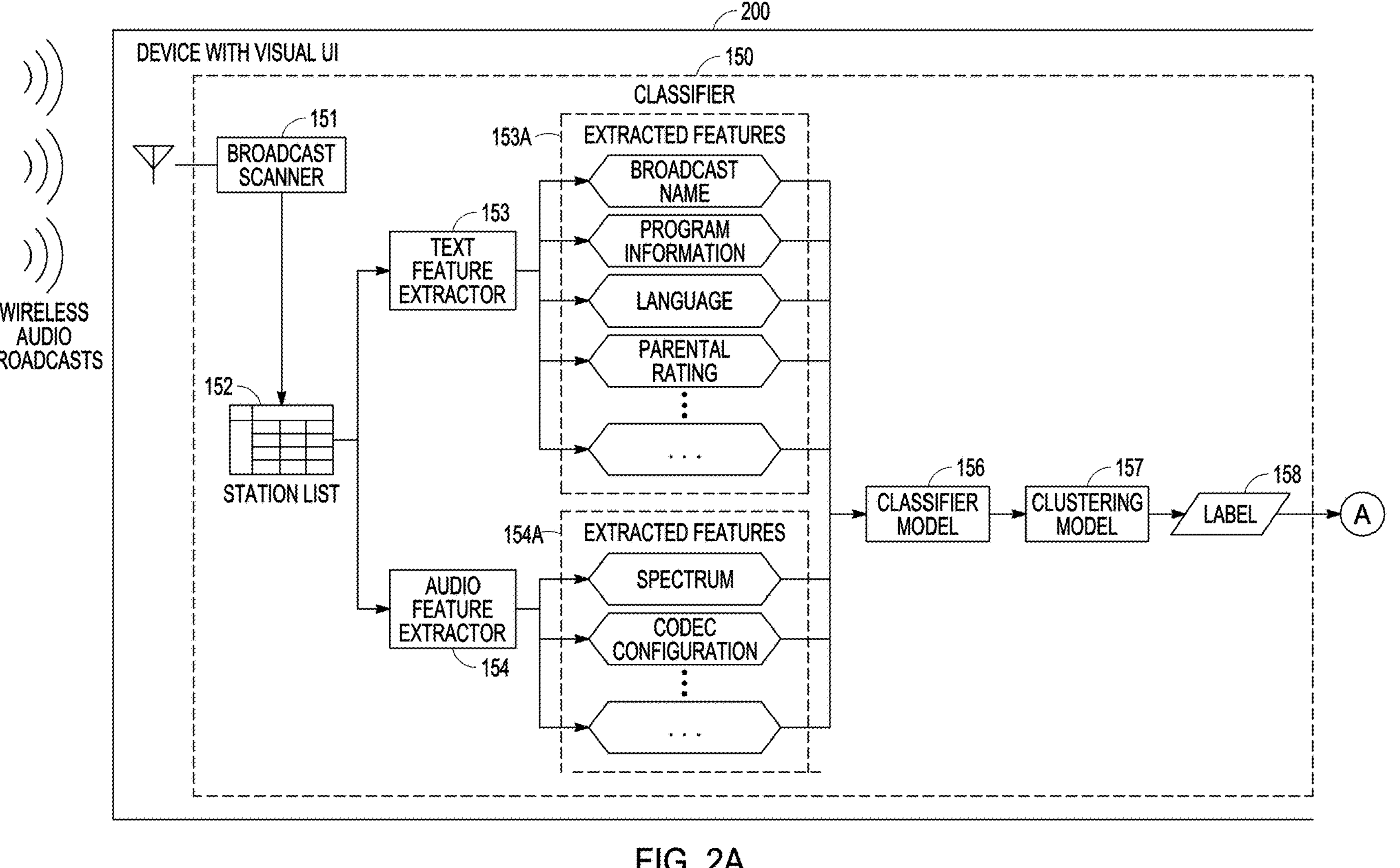
FIGS. 2A and 2B are a block diagram illustrating an embodiment of a system for scanning for, discovering, selecting, and subscribing to wireless audio broadcasts.
Figure 2B:
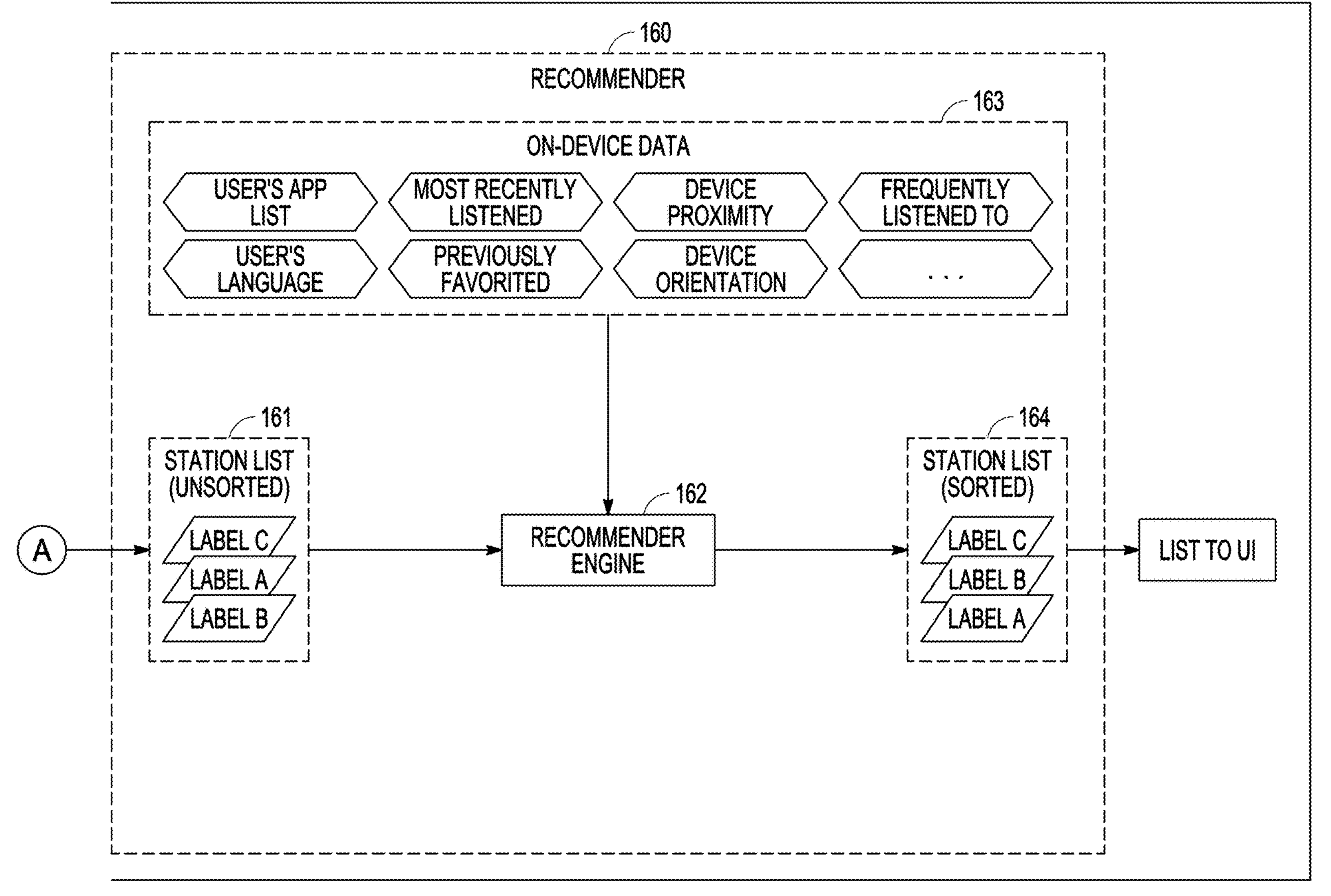

FIGS. 2A and 2B are a block diagram illustrating an embodiment of a system 200 to scan for, discover, select, and subscribe to wireless audio broadcasts, and that provides an aggregated, classified, and sorted list of available broadcasts in the device's vicinity. The system 200 can reside on the user device 130 of FIG. 1. The system or service is able to continuously scan for wireless audio broadcasts in the device's vicinity. The user device 130 has a classifier 150 and a recommender 160. The classifier and recommender create and display a list of broadcasts to an interface on the user device 130 such as laptop, smartphone, or tablet (or via a non-visual communication such as via headphones, speakers or earbuds). The service is able to classify available wireless broadcasts by both the broadcasts' textual metadata and the broadcasts' audio features.

The classifier 150 includes a broadcast scanner 151. The broadcast scanner 151 receives audio broadcasts that are available in the vicinity of the user device 130, and it creates a station list 152 of the audio broadcasts in that vicinity. The classifier 150 further includes a text feature extractor 153 and an audio feature extractor 154. The text feature extractor 153 extracts textual features at 153A such as a broadcast name, program information, program language and a parental rating. The audio feature extractor 154 extracts audio features at 154A such as a spectrum and a codec configuration. The classifier model 156 classifies the received audio broadcasts based on the extracted textual features and audio features, the clustering model 157 clusters the received audio broadcasts based on the extracted textual features and audio features, and the classified and/or clustered audio broadcasts are labeled at 158. For example, the extracted program information could indicate that a broadcast is about a local sports team, and the audio broadcast would then be descriptively labeled as such. These labeled broadcasts are then shared with the recommender 160.

As noted at 161, the list of broadcasts provided to the recommender 160 by the classifier 150 are unsorted. This unsorted list 151 is then provided to a recommender engine 162, and using the unsorted list 151 and on-device data 163, the recommender engine 162 generates a sorted list 164. This sorted list 164 is then displayed on the user interface of the user device 130. The sorted list 164 could also be presented to the user via a non-visual interface such as a headset. The service is able to automatically rank and/or order the classified available wireless broadcasts by applying a number of criteria, and the service can provide the ordered list to the user interface of the user device 130. Users may alternatively sort by various criteria as well.

Figure 3:
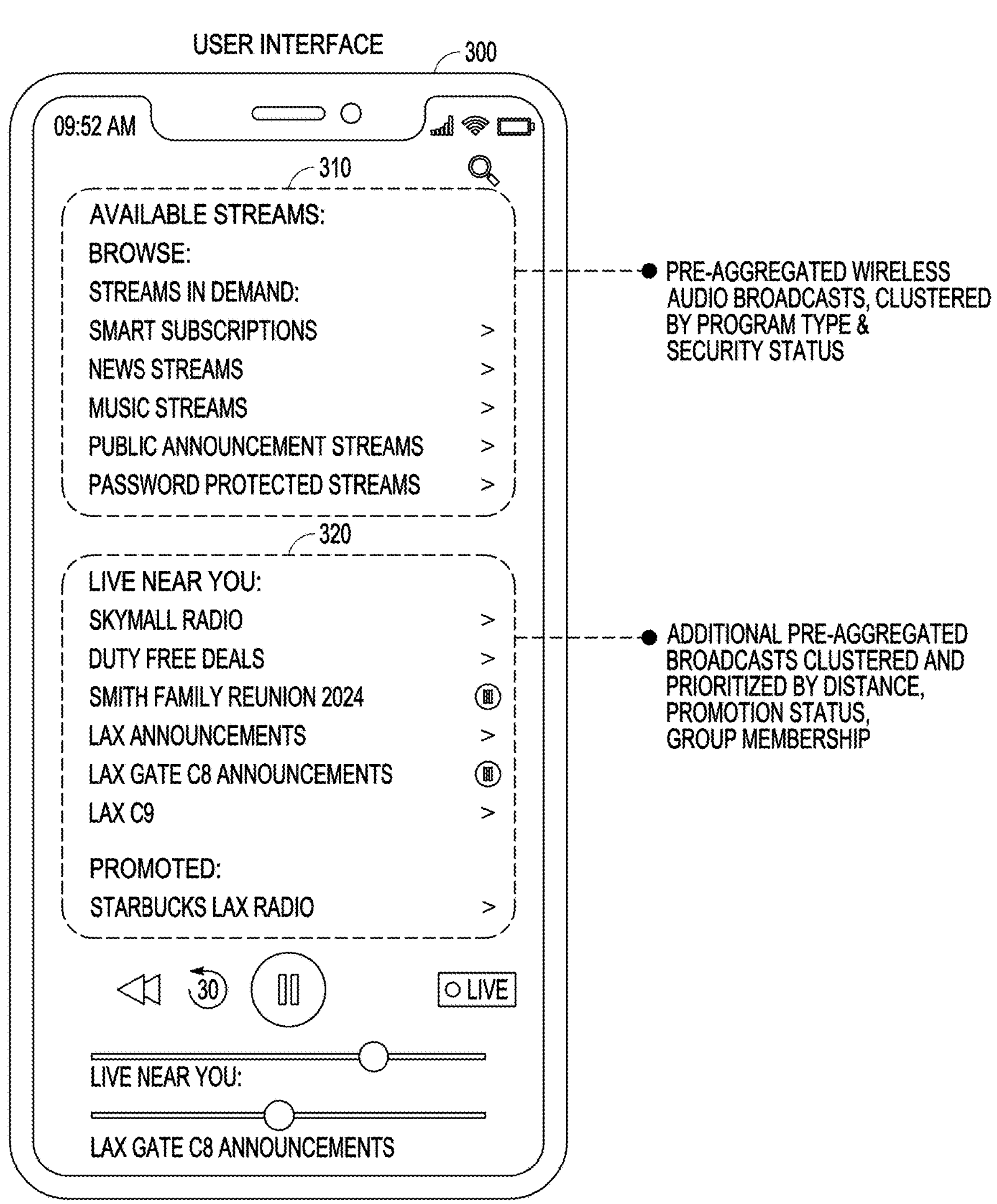
FIG. 3 is an example of a display interface of a system for scanning for, discovering, selecting and subscribing to wireless audio broadcasts.

FIG. 3 illustrates an example of a user interface 300 on the user device 130 such as a smart phone. The user interface 300 in FIG. 3 illustrates broadcasts that have been classified by program type (e.g., news streams) and security status (e.g., password protected streams) at 310, and broadcasts that have been classified by distance (e.g., broadcasts from the Skymall), promotion status (e.g., duty free deals) and group membership (e.g., Smith family reunion) at 320.

The system 200 of FIGS. 2A and 2B allows users to subscribe to wireless audio broadcasts contingent on one or more criteria. The system 200 also can have a priori knowledge of available wireless audio broadcasts available in a geographic location or point of interest. Users may, ahead of time, use the device to pre-subscribe to specific broadcasts. Upon entering the location with the pre-subscribed broadcast, the user's device 130 or receiver device 135 may automatically receive the broadcast without user input.

The system 200 of FIGS. 2A and 2B can also automatically bring to the foreground of the user device 130 available broadcasts when the user device 130 is in the vicinity of the wireless audio broadcasts in the case of a display with a visual user interface. In the case of a display with non-visual user interface, the tuning interface may be presented to the user through a voice user interface or in combination with tactile (button-based) controls. An embodiment can also include various types of user feedback modalities such as voice-based (using speech) and audio-based (using non-speech sounds). Additionally, an embodiment could include any type of user input modality such as voice-based (user speaks their selection) and the previously noted tactile controls (user pushes a button, rotates knob, etc.).

The system 200 can further automatically select and begin receiving the most relevant broadcast based on the service described when the user dons the listening device (e.g., headphones, earbuds, and/or other similar devices).

Figure 4A:
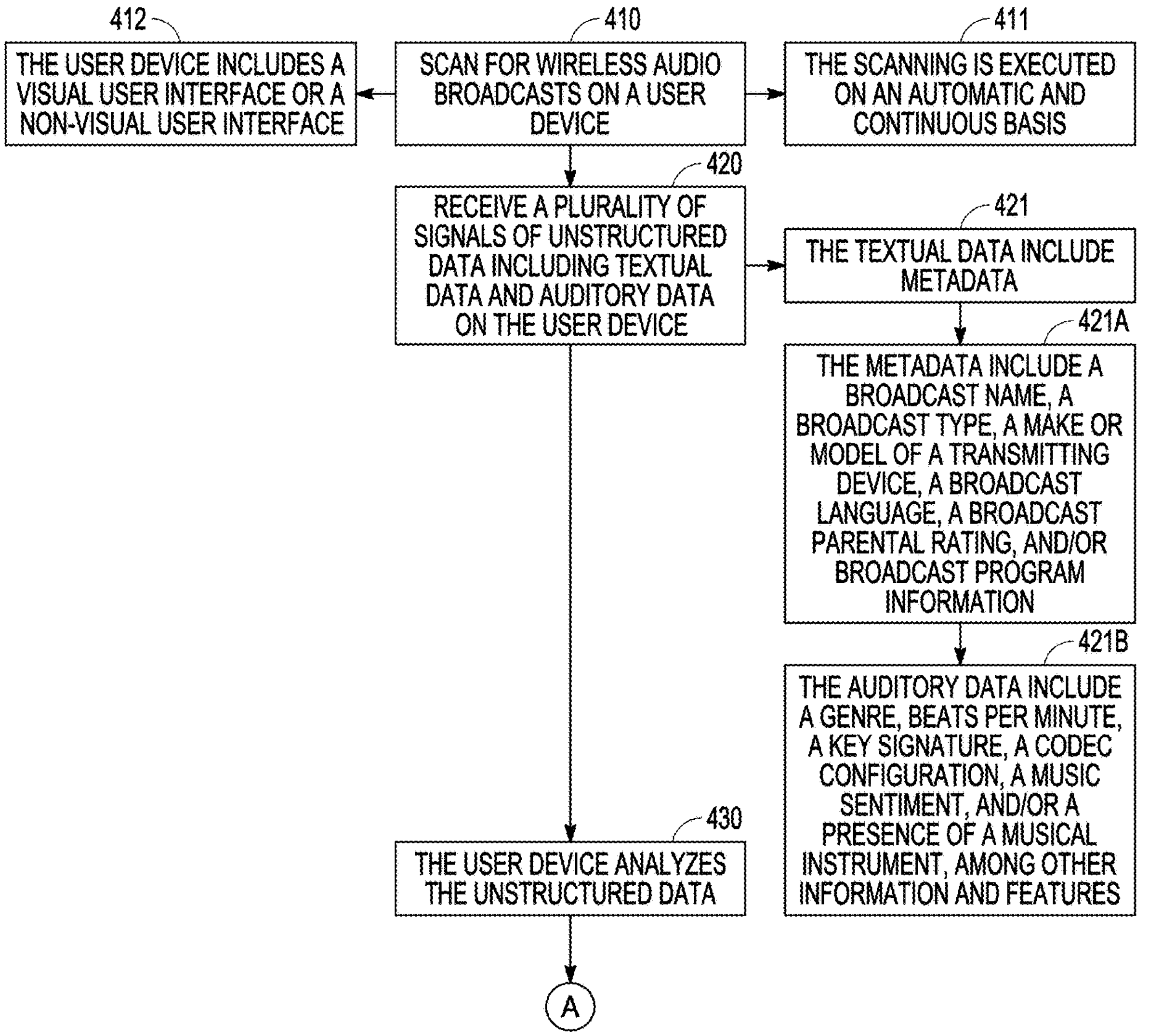
FIGS. 4A, 4B and 4C are a block diagram illustrating operations and features of a system for scanning for, discovering, selecting and subscribing to wireless audio broadcasts.
Figure 4B:
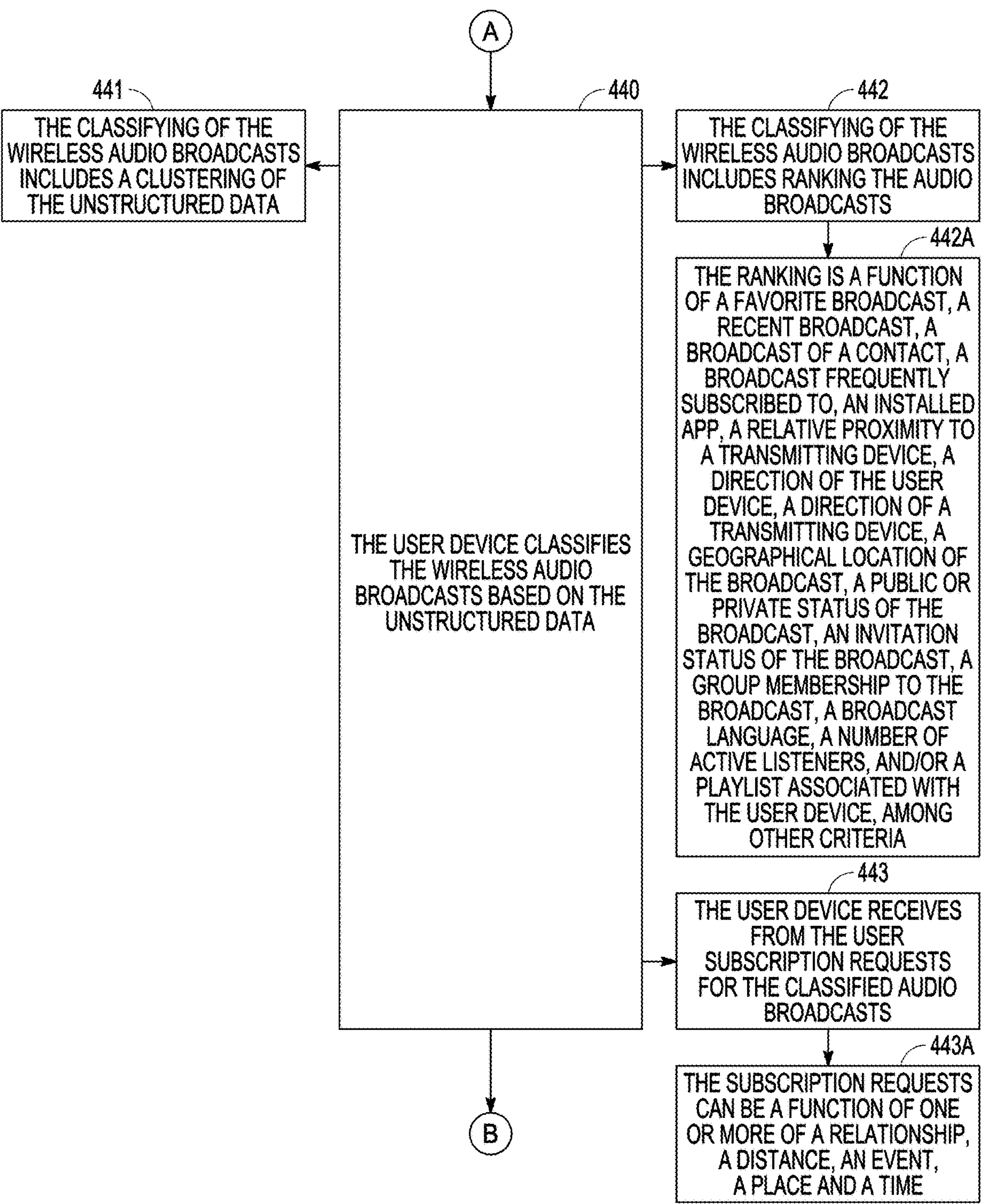
Figure 4C:
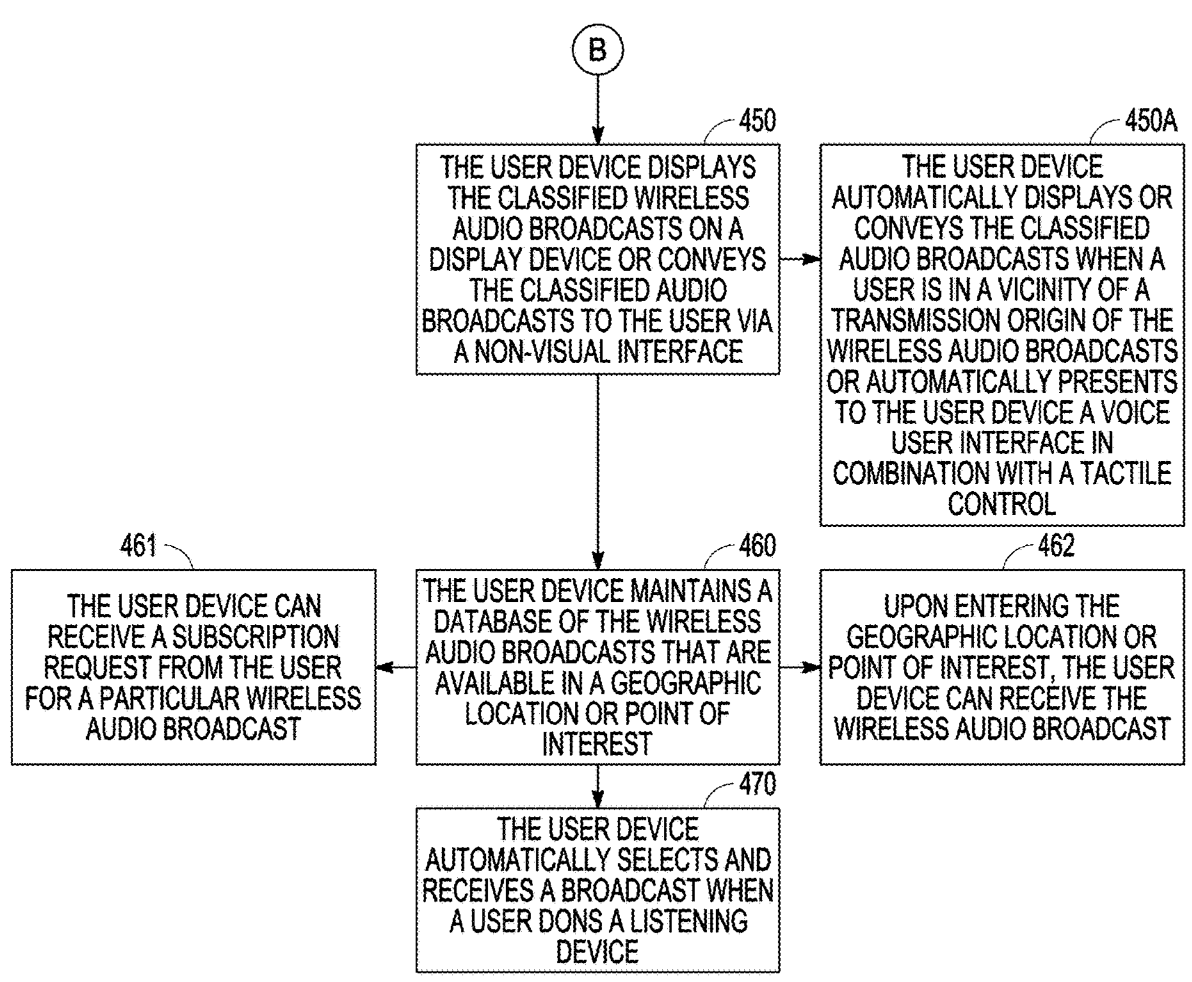

FIGS. 4A, 4B and 4C are a block diagram illustrating operations and features of a system for scanning for, discovering, selecting and subscribing to wireless audio broadcasts. FIGS. 4A, 4B and 4C include a number of process and feature blocks 410-470. Though arranged substantially serially in the example of FIGS. 4A, 4B and 4C, other examples may reorder the blocks, omit one or more blocks, and/or execute two or more blocks in parallel using multiple processors or a single processor organized as two or more virtual machines or sub-processors.

Referring now to FIGS. 4A, 4B and 4C, at 410, a service on a user device scans for wireless audio broadcasts. The wireless audio broadcasts originate in the vicinity of the user device. As indicated at 411, the scanning for the wireless audio broadcasts can be executed on an automatic and continuous basis. And as indicated at 412, the user device can include a visual user interface or a non-visual user interface.

At 420, the user device receives a plurality of signals. The plurality of signals includes unstructured data. The unstructured data include textual data and auditory data that relate to the wireless audio broadcasts. As indicated at 421, the textual data can include metadata, and as indicated at 421A the metadata can include a broadcast name, a broadcast type, a make or model of a transmitting device, a broadcast language, a broadcast parental rating, and/or broadcast program information, among other data. As indicated at 421B, the auditory data can include a genre, beats per minute, a key signature, a codec configuration, a music sentiment, and/or a presence of a musical instrument, among other information and features.

At 430, the user device analyzes the unstructured data, and at 440, the user device classifies the wireless audio broadcasts based on the unstructured data. At 441, the classifying of the wireless audio broadcasts based on the unstructured data includes a clustering of the unstructured data.

As indicated at 442, the classifying of the wireless audio broadcasts includes ranking the audio broadcasts, and as indicated at 442A, the ranking can be a function of a favorite broadcast, a recent broadcast, a broadcast of a contact, a broadcast frequently subscribed to, an installed app, a relative proximity to a transmitting device, a direction of the user device, a direction of a transmitting device, a geographical location of the broadcast, a public or private status of the broadcast, an invitation status of the broadcast, a group membership to the broadcast, a broadcast language, a number of active listeners, and/or a playlist associated with the user device, among other criteria.

As indicated at 443, the user device can receive from the user subscription requests for the classified audio broadcasts from the user device. At 443A, the subscription requests can be a function of one or more of a relationship, a distance, an event, a place and a time. For example, a relationship may be a friend of the user, and the distance may be when the user is near to that friend. An event can be a request to subscribe to a broadcast until the user's flight leaves. A place can be a request to subscribe while the user is at a train station. And a time can be a request to subscribe to a broadcast for the next hour.

As indicated at 450, the user device can display the classified wireless audio broadcasts on a display device or convey the classified audio broadcasts to the user via a non-visual interface. At 450A, the user device automatically displays or conveys the classified audio broadcasts when a user is in a vicinity of a transmission origin of the wireless audio broadcasts or automatically presents to the user device a voice user interface in combination with a tactile (e.g., button-based) control.

At 460, the user device can maintain a database of the wireless audio broadcasts that are available in a geographic location or point of interest. At 461, the user device can receive a subscription request from the user for a particular wireless audio broadcast, and at 462, upon entering the geographic location or point of interest, the user device can receive the wireless audio broadcast.

At 470, the user device can automatically select and receive a broadcast when a user dons a listening device. Such listening devices can include headphones and earbuds.

Figure 5:
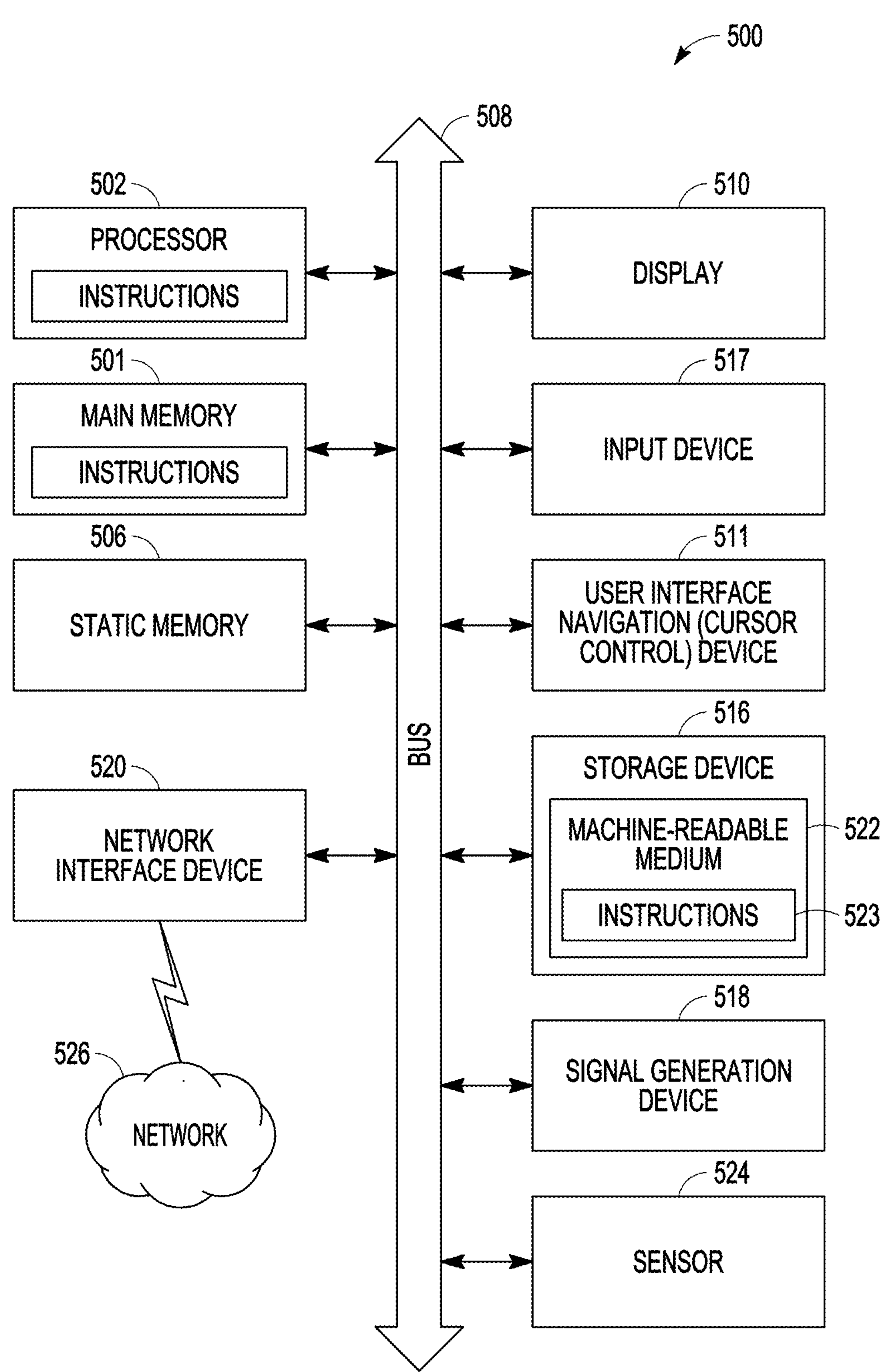
FIG. 5 is a block diagram of a computer architecture upon which one or more of the embodiments disclosed herein can execute.

FIG. 5 is a block diagram illustrating a computing and communications platform 500 in the example form of a general-purpose machine on which some or all the operations of FIGS. 4A, 4B and 4C may be carried out according to various embodiments. In certain embodiments, programming of the computing platform 500 according to one or more particular algorithms produces a special-purpose machine upon execution of that programming. In a networked deployment, the computing platform 500 may operate in the capacity of either a server or a client machine in server-client network environments, or it may act as a peer machine in peer-to-peer (or distributed) network environments.

Example computing platform 500 includes at least one processor 502 (e.g., a central processing unit (CPU), a graphics processing unit (GPU) or both, processor cores, compute nodes, etc.), a main memory 501 and a static memory 506, which communicate with each other via a link 508 (e.g., bus). The computing platform 500 may further include a video display unit 510, input devices 517 (e.g., a keyboard, camera, microphone), and a user interface (UI) navigation device 511 (e.g., mouse, touchscreen). The computing platform 500 may additionally include a storage device 516 (e.g., a drive unit), a signal generation device 518 (e.g., a speaker), a sensor 524, and a network interface device 520 coupled to a network 526.

The storage device 516 includes a non-transitory machine-readable medium 522 on which is stored one or more sets of data structures and instructions 523 (e.g., software) embodying or utilized by any one or more of the methodologies or functions described herein. The instructions 523 may also reside, completely or at least partially, within the main memory 501, static memory 506, and/or within the processor 502 during execution thereof by the computing platform 500, with the main memory 501, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 523. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for scanning for wireless audio broadcasts on a user device, the wireless audio broadcasts originating in a vicinity of the user device; receiving a plurality of signals at the user device, the plurality of signals comprising unstructured data, the unstructured data comprising textual data and auditory data relating to the wireless audio broadcasts; analyzing the unstructured data; and classifying the wireless audio broadcasts based on the unstructured data.

Example No. 2 includes all the features of Example No. 1, and optionally includes a process wherein the user device comprises a visual user interface or a non-visual user interface.

Example No. 3 includes all the features of Example Nos. 1-2, and optionally includes a process wherein the textual data comprise metadata.

Example No. 4 includes all the features of Example Nos. 1-3, and optionally includes a process wherein the metadata comprise one or more of a broadcast name, a broadcast type, a make or model of a transmitting device, a broadcast language, a broadcast parental rating, and broadcast program information.

Example No. 5 includes all the features of Example Nos. 1-4, and optionally includes a process wherein the auditory data comprise one or more of a genre, beats per minute, a key signature, a codec configuration, a music sentiment, and a presence of a musical instrument.

Example No. 6 includes all the features of Example Nos. 1-5, and optionally includes a process wherein the classifying of the wireless audio broadcasts comprises ranking the audio broadcasts.

Example No. 7 includes all the features of Example Nos. 1-6, and optionally includes a process wherein the ranking comprises a function of one or more of a favorite broadcast, a recent broadcast, a broadcast of a contact, a broadcast frequently subscribed to, an installed app, a relative proximity to a transmitting device, a direction of the user device, a direction of a transmitting device, a geographical location of the broadcast, a public or private status of the broadcast, an invitation status of the broadcast, a group membership to the broadcast, a broadcast language, a number of active listeners, and a playlist associated with the user device.

Example No. 8 includes all the features of Example Nos. 1-7, and optionally includes a process comprising displaying the classified wireless audio broadcasts on a display device or conveying the classified audio broadcasts to the user via an non-visual interface.

Example No. 9 includes all the features of Example Nos. 1-8, and optionally includes a process comprising automatically displaying or conveying the classified audio broadcasts when a user is in a vicinity of a transmission origin of the wireless audio broadcasts or automatically presenting to the user device a voice user interface in combination with a tactile (button-based) control.

Example No. 10 includes all the features of Example Nos. 1-9, and optionally includes a process comprising receiving subscription requests for the classified audio broadcasts from the user device.

Example No. 11 includes all the features of Example Nos. 1-10, and optionally includes a process wherein the subscription requests are a function of one or more of a relationship, a distance, an event, a place and a time.

Example No. 12 includes all the features of Example Nos. 1-11, and optionally includes a process comprising maintaining a database of the wireless audio broadcasts that are available in a geographic location or point of interest; receiving a subscription request from the user device for a particular wireless audio broadcast; and upon entering the geographic location or point of interest, transmitting the wireless audio broadcast to the user device.

Example No. 13 includes all the features of Example Nos. 1-12, and optionally includes a process comprising automatically selecting and receiving a broadcast when a user dons a listening device. (e.g., headphones, earbuds, etc.).

Example No. 14 includes all the features of Example Nos. 1-13, and optionally includes a process wherein the scanning for the wireless audio broadcasts is executed on an automatic and continuous basis.

Example No. 15 includes all the features of Example Nos. 1-14, and optionally includes a process wherein the classifying the wireless audio broadcasts based on the unstructured data comprises a clustering of the unstructured data.

Example No. 16 is a user device comprising a computer processor and a memory coupled to the computer processor; wherein the computer processor and the memory are configured for scanning for wireless audio broadcasts on the user device, the wireless audio broadcasts originating in a vicinity of the user device; receiving a plurality of signals at the user device, the plurality of signals comprising unstructured data, the unstructured data comprising textual data and auditory data relating to the wireless audio broadcasts; analyzing the unstructured data; and classifying the wireless audio broadcasts based on the unstructured data.

Example No. 17 includes all the features of Example No. 16, and optionally includes a user device wherein the classifying of the wireless audio broadcasts comprises clustering and ranking the audio broadcasts.

Example No. 18 includes all the features of Example Nos. 16-17, and optionally includes a user device wherein the user device is configured for permitting the user to requests subscription for the classified audio broadcasts.

Example No. 19 includes all the features of Example Nos. 16-18, and optionally includes a user device wherein the user device is configured for automatically selecting and receiving a broadcast when a user dons a listening device. (e.g., headphones, earbuds, etc. . . . ).

Example No. 20 is a non-transitory computer-readable medium comprising instructions that when executed by a processor execute a process comprising scanning for wireless audio broadcasts on the user device, the wireless audio broadcasts originating in a vicinity of the user device; receiving a plurality of signals at the user device, the plurality of signals comprising unstructured data, the unstructured data comprising textual data and auditory data relating to the wireless audio broadcasts; analyzing the unstructured data; and classifying the wireless audio broadcasts based on the unstructured data.

The invention claimed is:

1. A method comprising:

scanning for wireless audio broadcasts on a user device, the wireless audio broadcasts originating in a vicinity of the user device;

receiving a plurality of signals at the user device, the plurality of signals comprising unstructured data, the unstructured data comprising textual data and auditory data relating to the wireless audio broadcasts;

analyzing the unstructured data; and classifying the wireless audio broadcasts based on the unstructured data.

2. The method of claim 1, wherein the user device comprises a visual user interface or a non-visual user interface.

3. The method of claim 1, wherein the textual data comprise metadata.

4. The method of claim 3, wherein the metadata comprise one or more of a broadcast name, a broadcast type, a make or model of a transmitting device, a broadcast language, a broadcast parental rating, and broadcast program information.

5. The method of claim 3, wherein the auditory data comprise one or more of a genre, beats per minute, a key signature, a codec configuration, presence of speech, a music sentiment, and a presence of a musical instrument.

6. The method of claim 1, wherein the classifying of the wireless audio broadcasts comprises ranking the audio broadcasts.

7. The method of claim 6, wherein the ranking comprises a function of one or more of a favorite broadcast, a recent broadcast, a broadcast of a contact, a broadcast frequently subscribed to, an installed app, a relative proximity to a transmitting device, a direction of the user device, a direction of a transmitting device, a geographical location of the broadcast, a public or private status of the broadcast, an invitation status of the broadcast, a group membership to the broadcast, a broadcast language, a number of active listeners, and a playlist associated with the user device.

8. The method of claim 1, comprising displaying the classified wireless audio broadcasts on a display device or conveying the classified audio broadcasts to the user via a non-visual interface.

9. The method of claim 8, comprising automatically displaying or conveying the classified audio broadcasts when a user is in a vicinity of a transmission origin of the wireless audio broadcasts or automatically presenting to the user device a voice user interface in combination with a tactile (button-based) control.

10. The method of claim 1, comprising receiving subscription requests for the classified audio broadcasts from the user device.

11. The method of claim 10, wherein the subscription requests are a function of one or more of a relationship, a distance, an event, a place and a time.

12. The method of claim 1, comprising maintaining a database of the wireless audio broadcasts that are available in a geographic location or point of interest; receiving a subscription request from the user device for a particular wireless audio broadcast; and upon entering the geographic location or point of interest, transmitting the wireless audio broadcast to the user device.

13. The method of claim 1, comprising automatically selecting and receiving a broadcast when a user dons a listening device comprising one or more of a headphone or an earbud.

14. The method of claim 1, wherein the scanning for the wireless audio broadcasts is executed on an automatic and continuous basis.

15. The method of claim 1, wherein the classifying the wireless audio broadcasts based on the unstructured data comprises a clustering of the unstructured data.

16. A user device comprising:

a computer processor; and a memory coupled to the computer processor;

wherein the computer processor and the memory are configured for:

scanning for wireless audio broadcasts on the user device, the wireless audio broadcasts originating in a vicinity of the user device;

receiving a plurality of signals at the user device, the plurality of signals comprising unstructured data, the unstructured data comprising textual data and auditory data relating to the wireless audio broadcasts;

analyzing the unstructured data; and classifying the wireless audio broadcasts based on the unstructured data.

17. The user device of claim 16, wherein the classifying of the wireless audio broadcasts comprises clustering and ranking the audio broadcasts.

18. The user device of claim 16, wherein the user device is configured for permitting the user to request a subscription for the classified audio broadcasts.

19. The user device of claim 16, wherein the user device is configured for automatically selecting and receiving a broadcast when a user dons a listening device.

20. A non-transitory computer-readable medium comprising instructions that when executed by a processor execute a process comprising:

scanning for wireless audio broadcasts on the user device, the wireless audio broadcasts originating in a vicinity of the user device;

receiving a plurality of signals at the user device, the plurality of signals comprising unstructured data, the unstructured data comprising textual data and auditory data relating to the wireless audio broadcasts;

analyzing the unstructured data; and classifying the wireless audio broadcasts based on the unstructured data.

* * * * *